(12) United States Patent
Richie et al.

(10) Patent No.: US 10,870,594 B2
(45) Date of Patent: Dec. 22, 2020

(54) FLOWBACK AND PRODUCED WATER TREATMENT METHOD

(71) Applicant: HEP Shalewater Solutions, LLC, Denver, CO (US)

(72) Inventors: James Chance Richie, Bloomfield Hills, MI (US); Anthony Gutta, Maidsville, WV (US)

(73) Assignee: HEP Shalewater Solutions, LLC, Denver, CO (US)

( * ) Notice: Subject to any disclaimer, the term of this patent is extended or adjusted under 35 U.S.C. 154(b) by 156 days.

(21) Appl. No.: 16/194,459

(22) Filed: Nov. 19, 2018

(65) Prior Publication Data

US 2019/0084847 A1     Mar. 21, 2019

Related U.S. Application Data

(60) Division of application No. 15/648,566, filed on Jul. 13, 2017, now Pat. No. 10,160,672, which is a continuation of application No. 14/471,186, filed on Aug. 28, 2014, now Pat. No. 9,731,987.

(60) Provisional application No. 61/872,131, filed on Aug. 30, 2013.

(51) Int. Cl.
| | |
|---|---|
| *C02F 1/52* | (2006.01) |
| *B01D 21/00* | (2006.01) |
| *C02F 1/00* | (2006.01) |
| *C02F 1/40* | (2006.01) |

(Continued)

(52) U.S. Cl.
CPC ........ *C02F 1/5281* (2013.01); *B01D 21/0003* (2013.01); *B01D 21/003* (2013.01); *B01D 2221/08* (2013.01); *C02F 1/40* (2013.01); *C02F 2001/007* (2013.01); *C02F 2101/32* (2013.01); *C02F 2103/365* (2013.01); *C02F 2201/007* (2013.01); *C02F 2201/008* (2013.01); *C02F 2301/022* (2013.01); *C02F 2301/024* (2013.01);

(Continued)

(58) Field of Classification Search
CPC .. C02F 1/5281; B01D 21/0003; B01D 21/003
See application file for complete search history.

(56) References Cited

U.S. PATENT DOCUMENTS

| | | | |
|---|---|---|---|
| 3,517,815 A | 6/1970 | Bolton et al. | |
| 4,303,517 A * | 12/1981 | Love | B01D 21/0045 |
| | | | 210/208 |
| 4,867,872 A | 9/1989 | Russell et al. | |

(Continued)

FOREIGN PATENT DOCUMENTS

WO        2013003012 A1    1/2013

*Primary Examiner* — Chester T Barry
(74) *Attorney, Agent, or Firm* — The Webb Law Firm (57) ABSTRACT

A method of treating flowback and produced water includes transferring flowback and produced water to a chemical treatment apparatus, mixing treatment chemicals with the flowback and produced water, transferring the mixture of treatment chemicals and flowback and produced water to a weir tank comprising a first end, a second end, an internal chamber, and a plurality of baffles positioned throughout the internal chamber to induce turbulent flow, transferring the mixture of treatment chemicals and flowback and produced water to a first settling tank that provides laminar flow, and transferring the mixture of treatment chemicals and flowback and produced water to a second settling tank that provides laminar flow.

17 Claims, 10 Drawing Sheets

(51) Int. Cl.
*C02F 101/32* (2006.01)
*C02F 103/36* (2006.01)

(52) U.S. Cl.
CPC ..... *C02F 2301/08* (2013.01); *Y10T 137/2093* (2015.04)

(56) References Cited

U.S. PATENT DOCUMENTS

| | | |
|---|---|---|
| 5,423,981 A | 6/1995 | Krieger |
| 5,863,433 A * | 1/1999 | Behrends ................ C02F 3/00 210/150 |
| 5,904,855 A | 5/1999 | Manz et al. |
| 6,558,558 B1 | 5/2003 | Hall |
| 2002/0166819 A1 | 11/2002 | Dutil et al. |
| 2003/0089240 A1 | 5/2003 | Price et al. |
| 2009/0301973 A1 | 12/2009 | Hanna |
| 2011/0005999 A1 | 1/2011 | Randal |
| 2012/0312755 A1 | 12/2012 | Ryan et al. |
| 2013/0233807 A1 | 9/2013 | Boyle |
| 2014/0116467 A1 * | 5/2014 | McCosh ................ B09C 1/02 134/10 |
| 2017/0107134 A1 | 4/2017 | Wiemers et al. |
| 2017/0107136 A1 | 4/2017 | Wiemers et al. |
| 2017/0267558 A1 * | 9/2017 | Bugg ................... B01D 12/00 |
| 2017/0305766 A1 | 10/2017 | Richie et al. |

* cited by examiner

FLOWBACK AND PRODUCED WATER TREATMENT METHOD

CROSS REFERENCE TO RELATED APPLICATIONS

This application is a divisional of U.S. patent application Ser. No. 15/648,566, filed Jul. 13, 2017 now U.S. Pat. No. 10,160,672, which is a continuation of U.S. patent application Ser. No. 14/471,186, filed Aug. 28, 2014, now U.S. Pat. No. 9,731,987, which claims the benefit of U.S. Provisional Application No. 61/872,131, filed Aug. 30, 2013, each of which is hereby incorporated in their entirety by reference.

BACKGROUND OF THE INVENTION

Field of the Invention

The present invention relates to water treatment systems and, in particular, to a mobile flowback water and/or produced water re-use system and a method for water treatment.

Description of Related Art

In a hydraulic fracturing process, fracturing fluids are injected under pressure into a bore hole. The pressure drives the fluid into cracks and fractures forcing such openings to become larger and to propagate. The injected fracturing fluids mix with groundwater, gas, and other materials. When the pressure is removed, the fluid mixture flows back to the surface. Gas is then extracted from the fluid mixture. This fluid mixture, which is commonly referred to as "flowback water", has concentrations of oil, grease, metals, sealants, salts, and other unwanted materials. After the initial discharge of flowback water, the well continues to produce oil, water, and various other materials. The water continually produced from the well is commonly referred to as "produced water" and is similar in composition to flowback water.

Due to the typical lack of water resources needed for drilling operations, flowback and produced water are recycled for further use. As such, with the ongoing drilling for oil and gas, there is a high demand for efficient recycling processes that can effectively remove unwanted materials from flowback and produced water.

SUMMARY OF THE INVENTION

Generally, provided is an improved mobile water re-use system and method.

In certain preferred and non-limiting embodiments, the present invention is directed to a mobile water re-use system that can include a chemical treatment apparatus, at least one weir tank in fluid communication with the chemical treatment apparatus, and two or more settling tanks in fluid communication with each other, where at least one of the settling tanks is in fluid communication with the weir tank. The weir tank can have a first end, a second end, an internal chamber, and a plurality of baffles that provide, promote, facilitate, result in, and/or induce turbulent flow of fluid through the internal chamber. The settling tanks can provide laminar flow of fluid through the internal chamber.

In certain preferred and non-limiting embodiments, the weir tank includes baffles that extend up from a bottom portion of the internal chamber. These baffles can have an arm that extends out in a direction toward the first end of the weir tank. The baffles can also become shorter toward the second end of the weir tank. In some preferred and non-limiting embodiments, the weir tank further includes baffles that extend down from a top portion of the internal chamber. The baffles that extend down from the top portion of the internal chamber can be positioned above the arms of the baffles that extend up from the bottom portion of the internal chamber. The weir tank can also have a fluid inlet at the first end and a fluid outlet at the second end. The fluid outlet of the weir tank can include a hollow extension member that extends to a selected height within the internal chamber. The hollow extension member can have a bell-shaped inlet.

In certain preferred and non-limiting embodiments, the settling tank of the mobile water re-use system can include a first end having a fluid inlet port and a fluid outlet port, a second end, an internal chamber, and an internal feed line positioned within the internal chamber. The internal feed line can have a first end connected to the fluid outlet port and a second end that extends out toward the second end of the settling tank. The settling tank can further include a baffle plate positioned between the second end of the internal feed line and the first end of the settling tank. The baffle plate can span the entire width of the internal chamber of the settling tank. The bottom perimeter of the baffle plate can be positioned below an opening at the second end of the internal feed line. Further, in some preferred and non-limiting embodiments, a gap can be formed between a top perimeter of the baffle plate and a top portion of the internal chamber of the settling tank. The mobile water re-use system can also include a holding tank in fluid communication with at least one of the settling tanks. The fluid communication between the at least one weir tank, two or more settling tanks, and/or holding tanks can be established by fluid connectors having an internal diameter of greater than about 8 inches. In some embodiments, the mobile water re-use system is automatically controlled by a programmable logic controller, a computer, software, firmware, programmable instructions, and/or the like.

In certain preferred and non-limiting embodiments, the present invention is also directed to a method of treating flowback and produced water. The method can include: transferring flowback and produced water to a chemical treatment apparatus; mixing treatment chemicals with the flowback and produced water; transferring the mixture of treatment chemicals and flowback and produced water to a weir tank having a first end, a second end, an internal chamber, and a plurality of baffles positioned throughout the internal chamber to provide, promote, facilitate, result in, and/or induce turbulent flow; transferring the mixture of treatment chemicals and flowback and produced water to a first settling tank that provides, promotes, facilitates, results in, and/or induces laminar flow; and transferring the mixture of treatment chemicals and flowback and produced water to a second settling tank that provides, promotes, facilitates, results in, and/or induces laminar flow.

In another preferred and non-limiting embodiment, the method includes: transferring flowback and produced water to a chemical treatment apparatus; mixing the flowback and produced water with treatment chemicals; transferring the mixture of treatment chemicals and flowback and produced water to a first weir tank having a first end, a second end, an internal chamber, and a plurality of baffles positioned throughout the internal chamber to provide, promote, facilitate, result in, and/or induce turbulent flow through the internal chamber; transferring the mixture of treatment chemicals and flowback and produced water back to the chemical treatment apparatus; mixing the flowback and produced water with additional treatment chemicals; transferring the mixture of treatment chemicals and flowback and produced water to a second weir tank having a first end, a second end, an internal chamber, and a plurality of baffles positioned throughout the internal chamber to provide, promote, facilitate, result in, and/or induce turbulent flow through the internal chamber; transferring the mixture of treatment chemicals and flowback and produced water to a first settling tank that provides, promotes, facilitates, results in, and/or induces laminar flow; and transferring the mixture of treatment chemicals and flowback and produced water to a second settling tank that provides, promotes, facilitates, results in, and/or induces laminar flow.

In certain preferred and non-limiting embodiments, the methods described above can also include an initial step of transferring the flowback and produced water to a filtering device or separate weir tank before entering the chemical treatment apparatus. Additionally, the methods of treating flowback and produced water can include transferring the mixture of treatment chemicals and flowback and produced water to a third settling tank that provides, promotes, facilitates, results in, and/or induces laminar flow and/or transferring the treated water to a holding tank after exiting the last settling tank. In some embodiments, the separated water can be transferred back to the chemical treatment apparatus after exiting the last settling tank or holding tank and mixed with additional treatment chemicals.

The present invention is also directed to a weir tank and a settling tank as described above.

DETAILED DESCRIPTION OF THE INVENTION

For purposes of the description hereinafter, the terms "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 1:
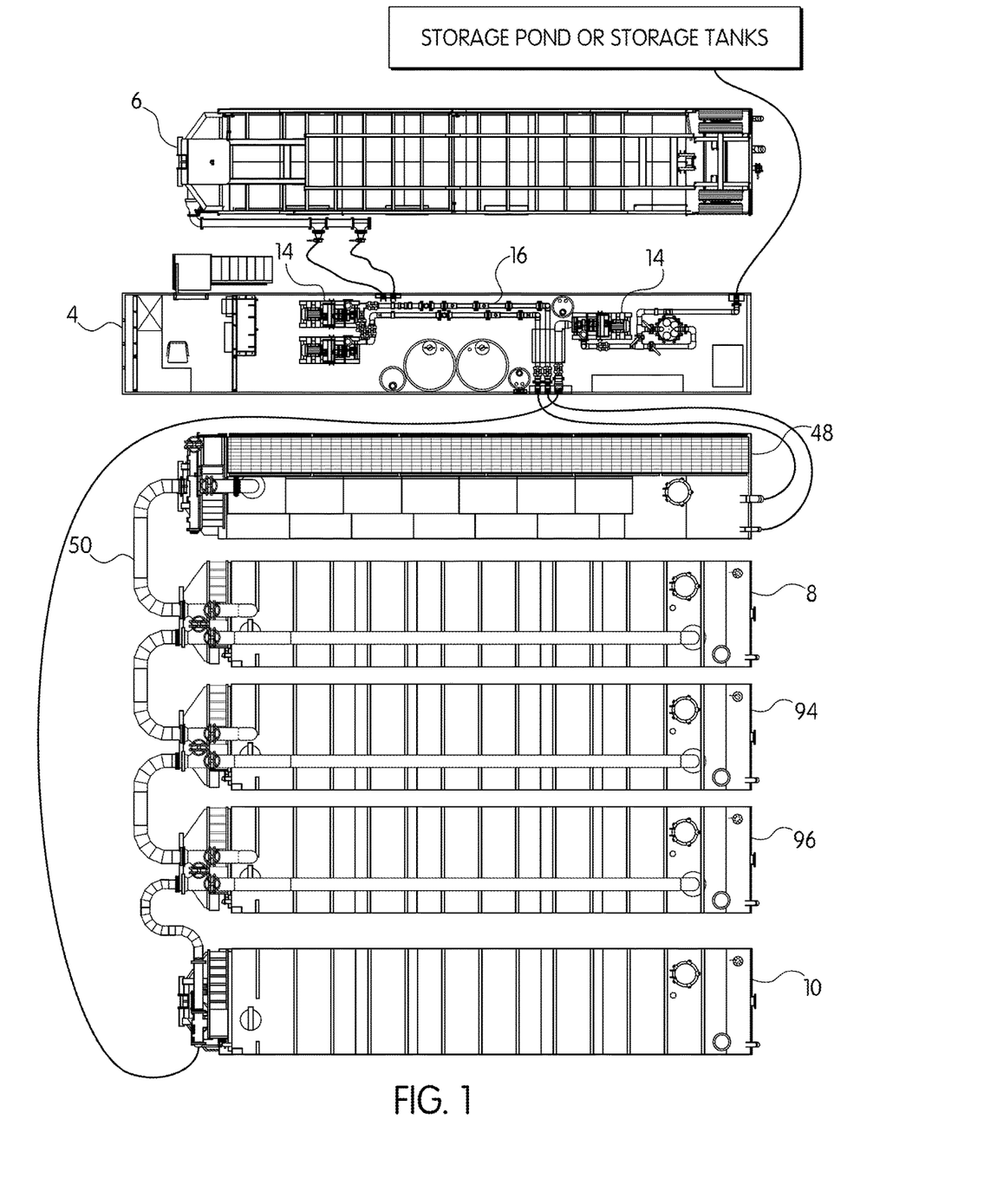
FIG. 1 is a top view of a water re-use system according to one embodiment of the present invention.
Figure 2:
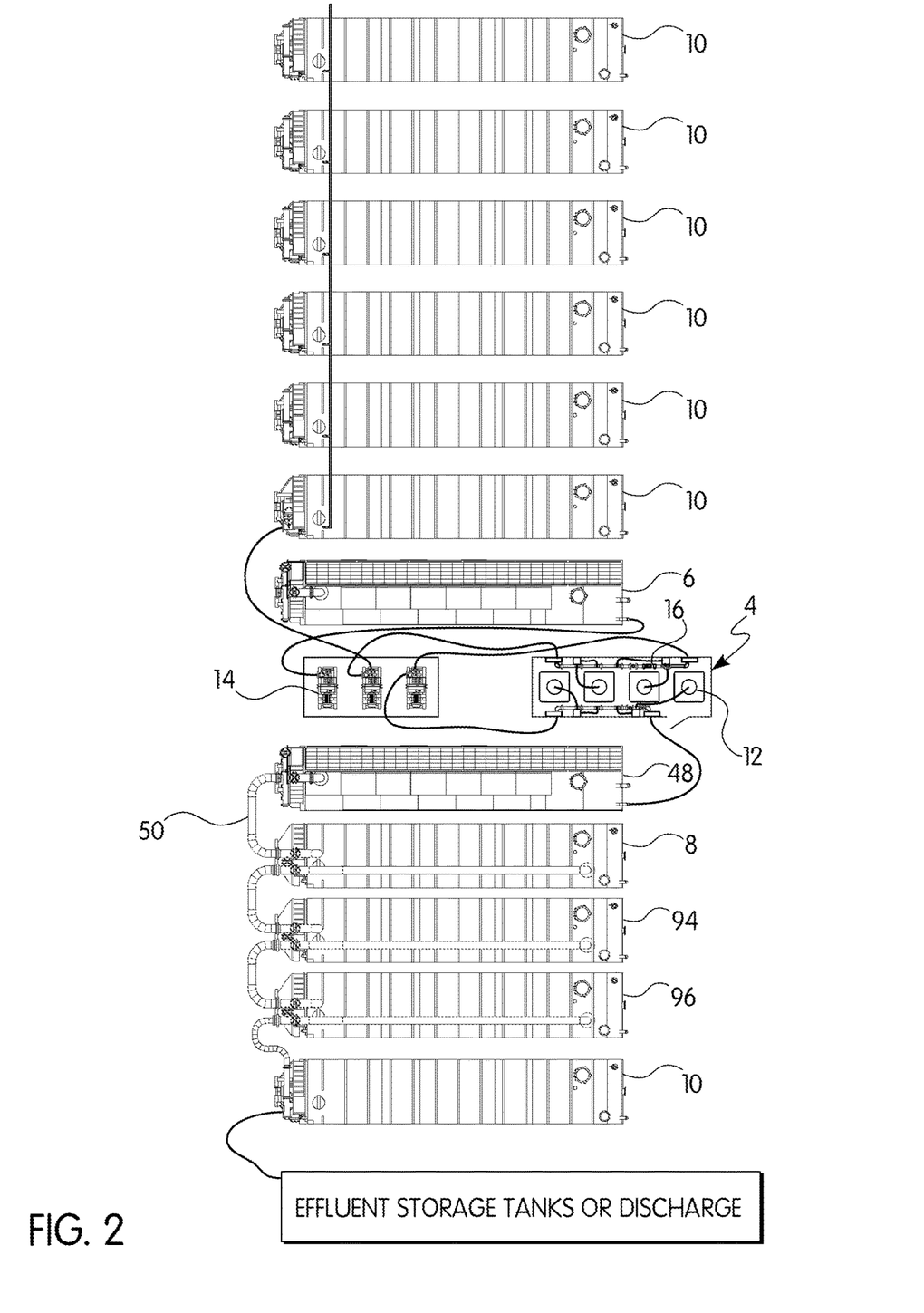
FIG. 2 is a top view of a water re-use system according to a second embodiment of the present invention.

In certain embodiments, referring to FIGS. 1-2, the present invention is directed to a mobile water re-use system that may include a chemical treatment apparatus 4, weir tanks 6, settling tanks 8, and/or holding tanks 10. As used herein, a "water re-use system" refers to a system that is capable of recycling and purifying flowback and produced water obtained from a fracturing process. Further, a "mobile water re-use system" means that the chemical treatment apparatus 4, weir tanks 6, settling tanks 8, holding tanks 10, and other components that make up the water re-use system are capable of being moved freely from one location to another. For example, in certain embodiments, the chemical treatment apparatus 4, weir tanks 6, settling tanks 8, and holding tanks 10 can include wheels, tires, casters, rollers, and/or the like, which allow them (individually and/or collectively) to be easily transported to different locations for installation and/or mobilization.

Figure 3:
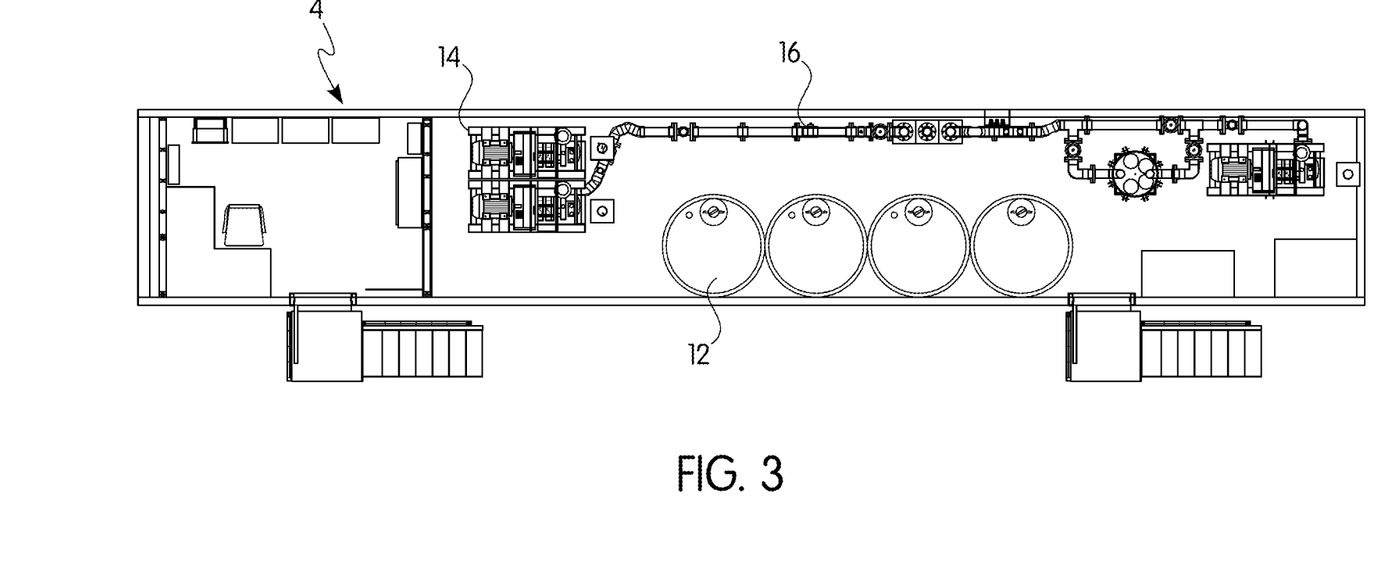
FIG. 3 is a top cross-sectional view of a chemical treatment apparatus according to one embodiment of the present invention.
Figure 4:
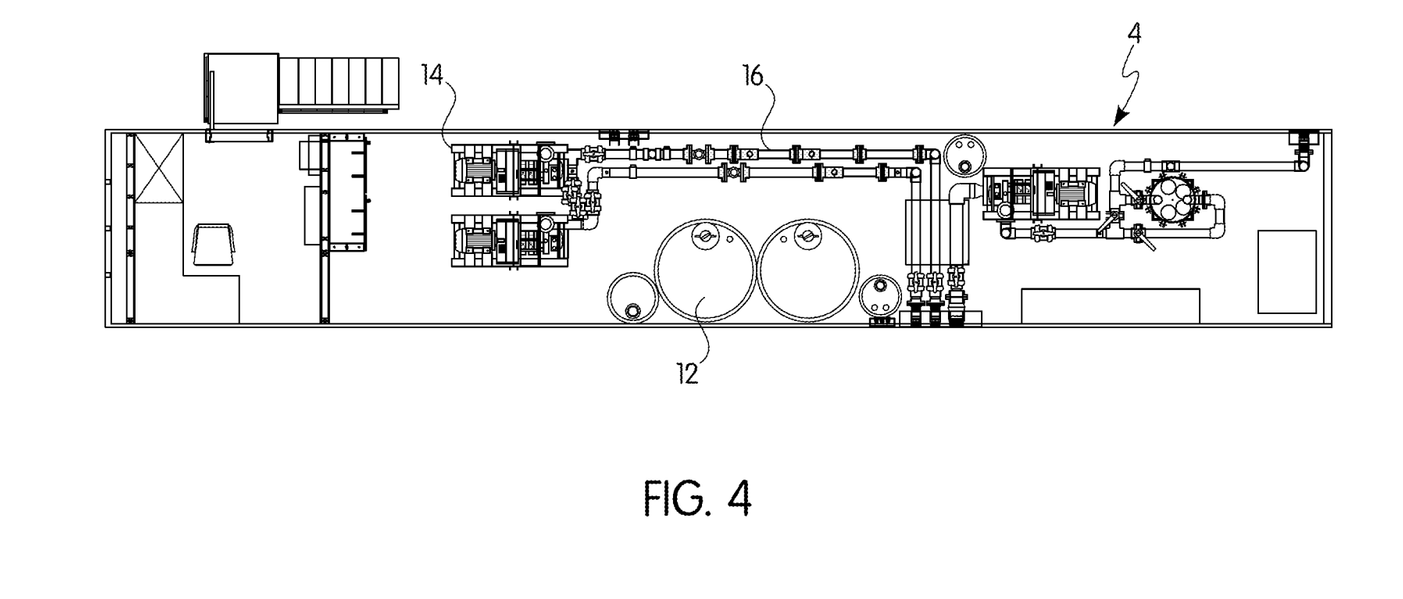
FIG. 4 is a top cross-sectional view of a chemical treatment apparatus according to a second embodiment of the present invention.

As indicated, the mobile water re-use system can include a chemical treatment apparatus 4. In certain preferred and non-limiting embodiments, as shown in FIGS. 3-4, the chemical treatment apparatus 4 may include a tank, trailer, or other apparatus that can house chemicals 12, pumping devices 14, and/or fluid mixers 16. Suitable fluid mixers 16 include, but are not limited to, conventional static fluid mixers that can uniformly mix the treatment chemicals 12 with the flowback and produced water. The chemicals 12 mixed with the flowback and produced water may include, but are not limited to, coagulation and flocculation compounds and compositions. "Coagulation" refers to the transformation of a liquid to a soft, semisoft, or solid mass. As such, "coagulation compounds and compositions" refers to compounds and compositions that are capable of transforming substances such as sludge, oil, and other materials into soft, semisoft, and/or solid particles. "Flocculation" refers to the bridging or agglomeration of solid particles together into clumps or "flocs", thereby facilitating their separation from liquids, such as water. Thus, "flocculation compounds and compositions" refers to compounds and compositions that can help agglomerate unwanted particles found in the flowback and produced water, such as the particles formed during the coagulation process, to facilitate separation of the particles from the water.

In certain preferred and non-limiting embodiments, as shown in FIG. 1, the chemical treatment apparatus 4 houses water treatment chemicals 12, one or more fluid mixers 16, and one or more pumping devices 14. Alternatively, as shown in FIG. 2, the chemical treatment apparatus 4 houses water treatment chemicals 12 and one or more fluid mixers 16, with the pumping devices 14 separated from and connected to the trailer or tank that houses the water treatment chemicals 12 and one or more fluid mixers 16. In both embodiments, the pumping devices 14 can be used to transport flowback and produced water into the fluid mixers 16 with the water treatment chemicals 12. The flowback and produced water can be pumped from a storage source where the flowback and produced water is transported after the fracturing process. For example, referring to FIG. 1, flowback and produced water can be transported to the chemical treatment apparatus 4 from a storage pond or a holding tank 10, such as a conventional "frac tank". In some of these embodiments, a separate filtering device can be used to remove large particles and sediment from the flowback and produced water before it enters the chemical treatment apparatus 4.

In another preferred and non-limiting embodiment, as shown in FIG. 2, flowback and produced water can first be pumped into a weir tank 6. As will described in detail below, the weir tank 6 is designed to trap particles found within flowback and produced water. After flowing through the weir tank 6, flowback and produced water can pumped into the chemical treatment apparatus 4.

During operation, the pumping devices 14 associated with the chemical treatment apparatus 4 can transport flowback and produced water into the fluid mixers 16, where the flowback and produced water is mixed with coagulation and/or flocculation chemicals 12. As shown in FIG. 3, the pumping devices 14 can be arranged in parallel. In another preferred and non-limiting embodiment shown in FIG. 4, the pumping devices 14 can be arranged in series.

Further, in certain preferred and non-limiting embodiments, the chemical treatment apparatus 4 can be operated with manual controls. In other embodiments, the chemical treatment apparatus 4 can be operated automatically using a controller such as, for example, a programmable logic controller, a microprocessor, a central processing unit, and/or any other like device capable of processing data, such as a computing device having programmable instructions or software thereon, which, when executed by a processor of the computing device, cause the processor to implement or facilitate the described steps. The controller can also be used to operate all or a portion of the processing and control steps and instructions of the water re-use system.

Figure 5:
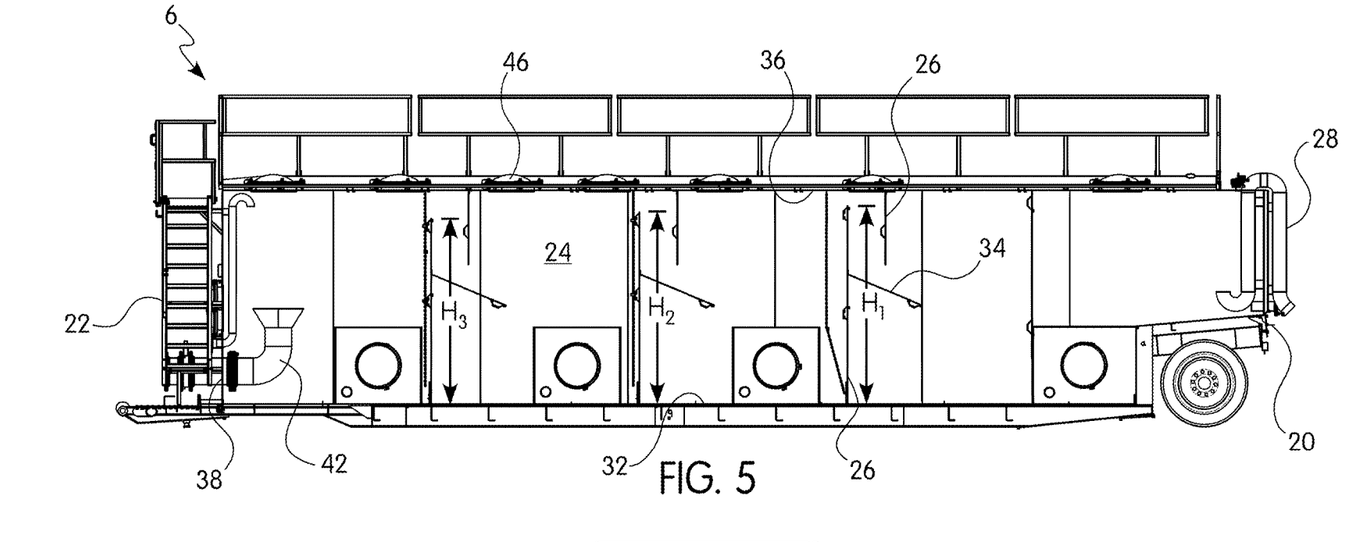
FIG. 5 is a cross-sectional side view of a weir tank according to one embodiment of the present invention.
Figure 6:
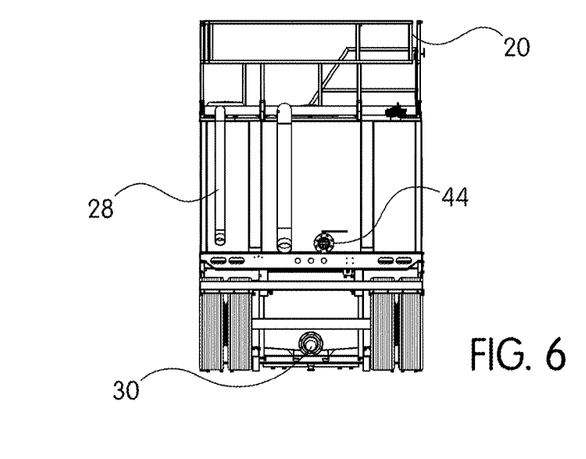
FIG. 6 is a front view of the first end of the weir tank shown in FIG. 5.

Referring to FIGS. 1 and 2, after mixing the treatment chemicals 12 with the flowback and produced water, the mixture can be transported into a weir tank 6, where the treatment chemicals 12 interact with the flowback and produced water. As shown in FIG. 5, the weir tank 6 may include a first end 20, a second end 22, an internal chamber 24, and a plurality of baffles 26 positioned throughout the internal chamber 24. Referring to FIG. 6, the first end 20 of the weir tank 6 can include a fluid inlet 28, such as, for example, a feed line, where the flowback and produced water can enter the weir tank 6. The first end 20 of the weir tank 6 can also include a drain 30 that can be used to remove water, sludge, oil, and other materials found within the internal chamber 24 of the weir tank 6. In certain preferred and non-limiting embodiments, the mixture of treatment chemicals 12 and flowback and produced water can be transported into the internal chamber 24 through the fluid inlet 28. The mixture can then flow through the internal chamber 24 comprising the plurality of baffles 26.

Referring to FIG. 5, the baffles 26 positioned throughout the internal chamber 24 of the weir tank 6 can be configured to allow fluids to flow to the second end 22 of the internal chamber 24, while simultaneously capturing sludge, oil, and other unwanted materials. The baffles 26 can also provide, promote, facilitate, result in, and/or induce turbulent flow through the internal chamber 24. As used herein, the term "turbulent flow" refers to a type of fluid flow in which the fluid undergoes irregular fluctuations, or mixing. During turbulent flow, the speed of the fluid is continuously undergoing changes in both magnitude and direction. The turbulent flow can cause coagulation and/or flocculation compounds to react with the materials found in the flowback and produced water.

In certain preferred and non-limiting embodiments, as shown in FIG. 5, the weir tank 6 can include baffles 26 that extend up from a bottom portion 32 of the internal chamber 24. The baffles 26 that extend up from the bottom portion 32 of the internal chamber 24 can each have an arm 34. The arm 34 can be attached and extend out from the baffle 26 in a direction toward the first end 20 of the weir tank 6. The baffles 26 and arms 34 are configured to capture soft, semisoft, and/or solid particles, such as sludge, oil, and other materials. For example, in certain preferred and non-limiting embodiments, the arm 34 can extend out at an angle from the baffle 26 to form a pocket like arrangement that can capture soft, semisoft, and/or solid particles found in the flowback and produced water that is flowing to the second end 22 of the internal chamber 24. In certain preferred and non-limiting embodiments, the angle formed between the arm 34 and baffle 26 is between about 10° and about 90°, in other preferred and non-limiting embodiments, between about 30° and about 85°, and in still further preferred and non-limiting embodiments, between about 50° and about 80°.

In one preferred and non-limiting embodiment, the baffles 26 extending up from the bottom portion 32 of the internal chamber 24 have different heights and are shorter at the second end 22 of the internal chamber 24. For example, FIG. 5 shows the different heights of three baffles, which are designated as $H_1$, $H_2$, and $H_3$, where the height of $H_1$ is greater than the height of $H_2$ and the height of $H_2$ is greater than the height of $H_3$. As such, in certain preferred and non-limiting embodiments, consecutively-placed baffles 26 can have different heights with the baffle 26 positioned closer to the second end 22 of the internal chamber 24 being shorter than the baffle 26 positioned closer to the first end 20 of the internal chamber 24. Because the baffles 26 are shorter at the second end 22, the flowback and produced water flowing to the second end 22 of the internal chamber 24 will cascade, or pour downward rapidly, over each baffle. The cascading of water provides, promotes, facilitates, results in, and/or induces turbulent flow causing coagulation and/or flocculation compounds to react with the materials found in the flowback and produced water, thereby producing larger particles or floccules of sludge, oil, and/or other unwanted materials.

Figure 7:
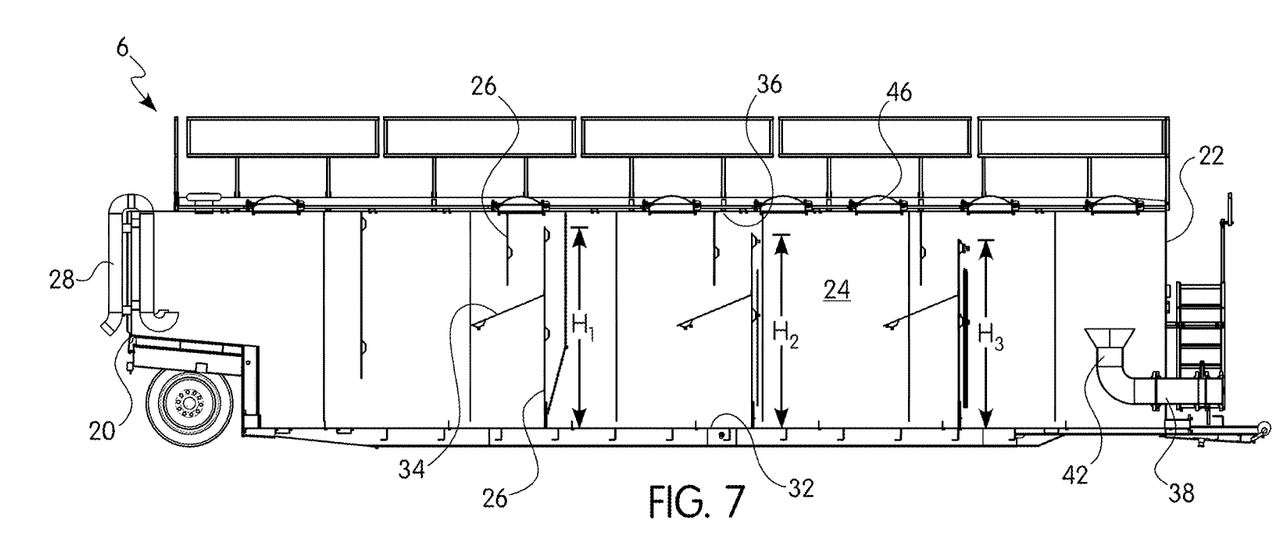
FIG. 7 is another cross-sectional side view of the weir tank shown in FIG. 5.

As shown in FIG. 5, the weir tank 6 can further include baffles 26 that extend down from a top portion 36 of the internal chamber 24. In certain preferred and non-limiting embodiments, each baffle 26 that extends up from the bottom portion 32 of the internal chamber 24 can be positioned directly before and/or after a baffle 26 that extends down from the top portion 36 of the internal chamber 24. In one preferred and non-limiting embodiment, referring to FIG. 5, some of the baffles 26 that extend down from a top portion 36 of the internal chamber 24 can be positioned above the arms 34 that are attached to the baffles 26 extending up from the bottom portion 32 of the internal chamber 24. In this preferred and non-limiting embodiment, flowback and produced water will flow through the space formed between the arm 34 and baffle 26 that extends down from the top portion 36 of the internal chamber 24. The flowback and produced water can then flow over the baffle 26 that extends up from the bottom portion 32 of the internal chamber 24. As water is flowing through the internal chamber 24, sludge, oil, and/or other unwanted materials can be captured by both types of baffles 26. FIG. 7 is another cross-sectional view of the weir tank and further illustrates the baffle 26 arrangements described herein. It is noted that the baffles 26 can be positioned within the internal chamber 24 of the weir tank 6 to form other arrangements and are not limited to the embodiments described above.

Figure 8:
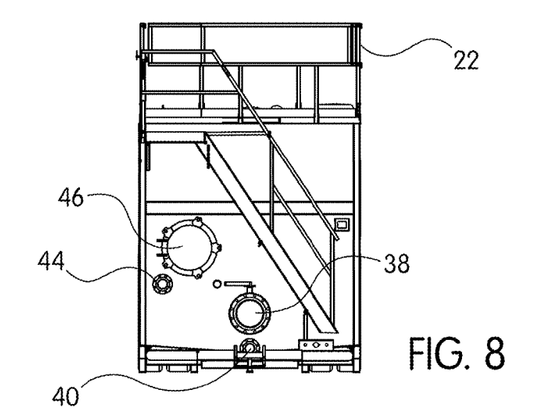
FIG. 8 is a front view of the second end of the weir tank shown in FIG. 5.

Once the flowback and produced water reaches the second end 22 of the internal chamber 24, it can exit the weir tank 6. As shown in FIG. 8, the water can exit second end 22 of the weir tank 6 through a fluid outlet 38. The second end 22 of the weir tank 6 can also include a drain 40 that can be used to remove water, sludge, oil, and/or other materials found within the internal chamber 24 of the weir tank 6.

In certain embodiments, and referring to FIGS. 5 and 7, the fluid outlet 38 can include a hollow extension member 42, such as a pipe or feed line. As further shown in FIGS. 5 and 7, the hollow extension member 42 may include a bell-shaped inlet that extends to a selected height within the internal chamber 24 of the weir tank 6. The raised bell shaped inlet helps prevent unwanted materials found on the bottom of the internal chamber 24 from exiting the weir tank 6. After entering the hollow extension member 42, flowback and produced water can exit the internal chamber 24 of the weir tank 6 through the fluid outlet 38. In certain preferred and non-limiting embodiments, the flowback and produced water naturally flows out through the fluid outlet 38 in a laminar flow. As used herein, "laminar flow" refers to a fluid that flows in parallel layers without disruption between the layers and in which there is little or no turbulence, i.e., little or no turbulent flow.

Figure 9:
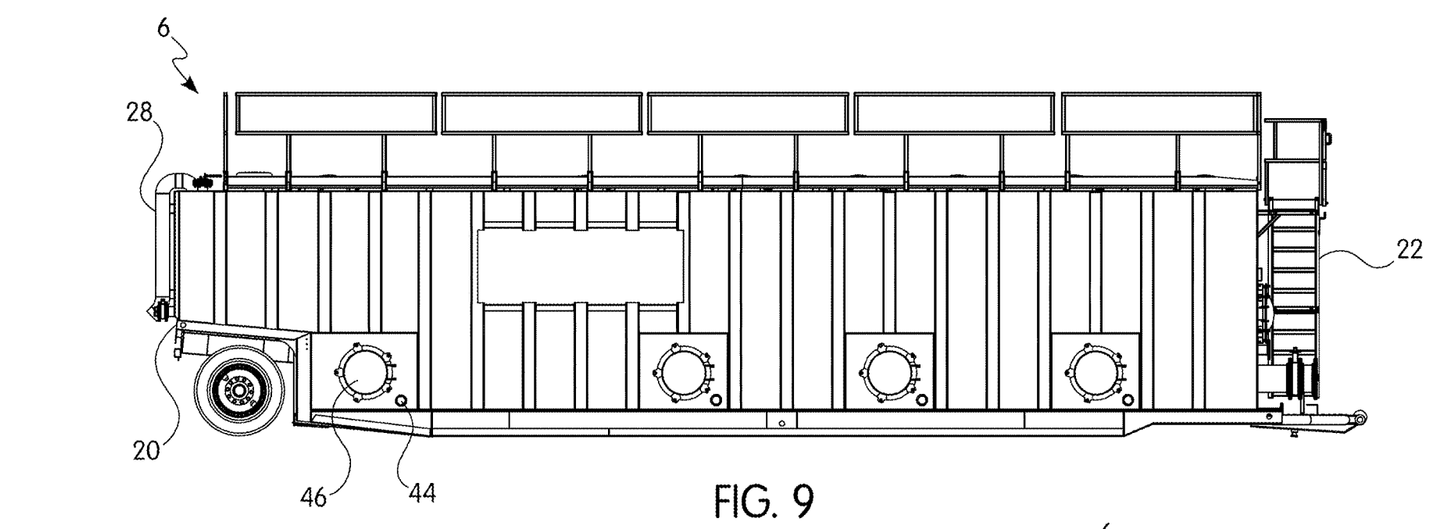
FIG. 9 is a side view of the weir tank of FIG. 5.
Figure 10:
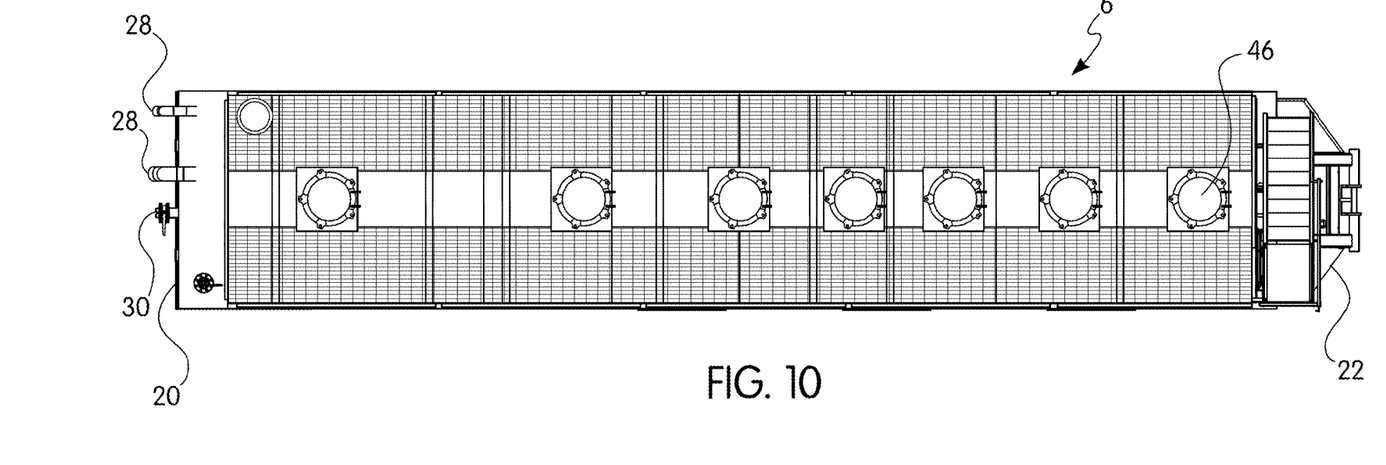
FIG. 10 is a top view of the weir tank of FIG. 5.
Figure 11:
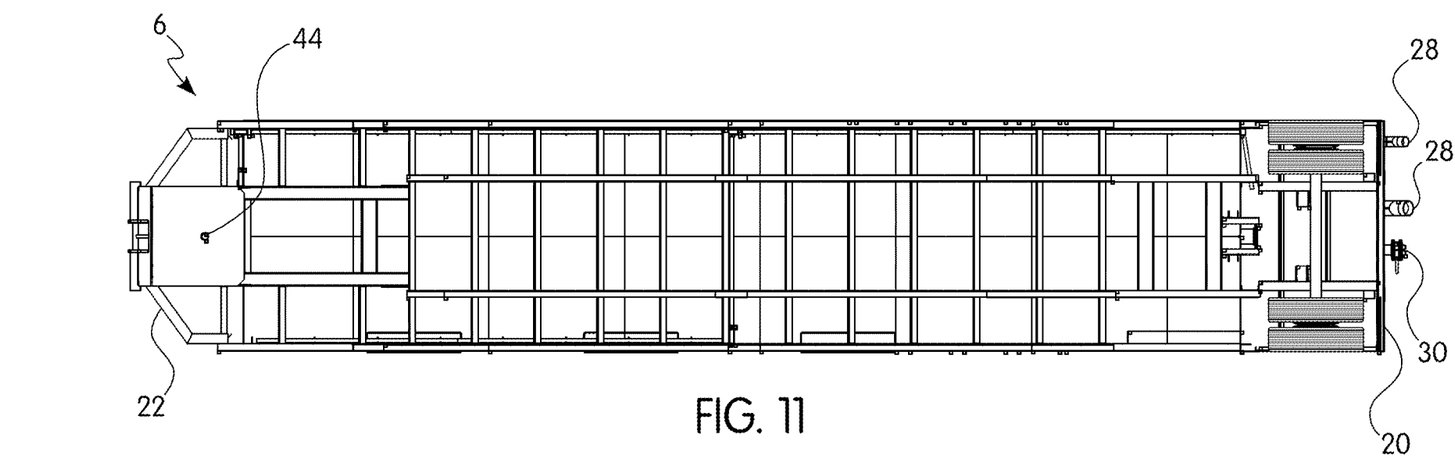
FIG. 11 is a bottom view of the weir tank of FIG. 5.

As indicated above, the baffles 26 positioned throughout the internal chamber 24 of the weir tank 6 can capture sludge, oil, and/or other undesirable materials. While some of these materials can be removed from the internal chamber 24 through drains 30, 40 located at the first end 20 and second end 22 of the weir tank 6, large amounts of these materials may remain in the internal chamber 24. Therefore, as shown in FIG. 9, the materials that remain within the internal chamber 24 can be removed through small access openings 44 located on the weir tank 6. As further shown in FIG. 9, the weir tank 6 can also include manways 46 or larger access openings. The manways 46 allow a person to enter the weir tank 6 to inspect, modify, repair, and/or clean the internal chamber 24. Small access openings 44 and/or manways 46 can be positioned anywhere on the weir tank 6. For instance, small access openings 44 and/or manways 46 can be positioned on the sides of the weir tank 6 (see FIG. 9), the top of the weir tank 6 (see FIG. 10), the bottom of the weir tank 6 (see FIG. 11), and/or the ends of the weir tank 6 (see FIGS. 6 and 8).

In one preferred and non-limiting embodiment, the flowback and produced water is first mixed in the chemical treatment apparatus 4 with coagulation chemicals 12 and then transported to a weir tank 4 as previously described. In such embodiments, the flowback and produced water can be transported back to the chemical treatment apparatus 4 after exiting the weir tank 6. The flowback and produced water can then be mixed with flocculation chemicals 12. After mixing the flowback and produced water with flocculation chemicals 12, the water can be transported to a second weir tank 48 as shown in FIGS. 1 and 2. The second weir tank 48 can be configured in the same manner as the first weir tank 6 to provide, promote, facilitate, result in, and/or induce turbulent flow and capture unwanted materials found within the water. When the treated water exits the second weir tank 48, the water can be transported to a first settling tank 8.

In another preferred and non-limiting embodiment, the flowback and produced water can be mixed simultaneously with both flocculation and coagulation chemicals 12. In these embodiments, flowback and produced water can react with the flocculation and coagulation chemicals 12 in a single weir tank 6. As such, when the treated water exits the first weir tank 6, the water can be transported directly to a first settling tank 8.

In certain preferred and non-limiting embodiments, the flowback and produced water is pumped out of the internal chamber 24 of the weir tank 6 or 48 and to a first settling tank 8. Alternatively, in other embodiments, the flowback and produced water naturally flows out through the fluid outlet 38 in a laminar flow to the first settling tank 8. As shown in FIGS. 1 and 2, a fluid connector 50 can be used to transfer the flowback and produced water to the first settling tank 8. Suitable fluid connectors 50 include, but are not limited to, plastic piping, such as poly-pipe. In certain preferred and non-limiting embodiments, the fluid connector 50 can be designed or configured to provide, promote, facilitate, result in, and/or induce laminar flow to the settling tank 8. For example, the fluid connector 50 can have a diameter that allows the water to flow naturally into the settling tank 8 without creating turbulence. In certain preferred and non-limiting embodiments, the fluid connector 50 has a diameter of greater than 8 inches, or greater than about 10 inches. In one embodiment, the fluid connector 50 has a diameter of about 12 inches or greater. In addition, the fluid connector 50 extending between the various tanks can form a particular shape including, but not limited to, a horseshoe-shape that provides, promotes, facilitates, results in, and/or induces laminar flow.

Figure 12:
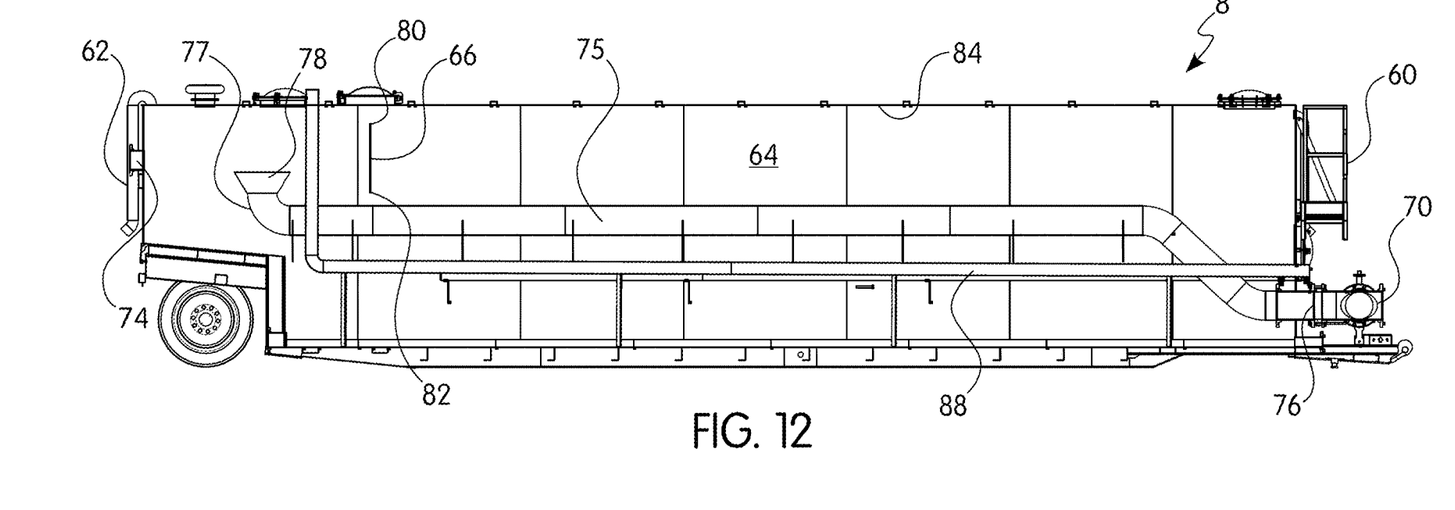
FIG. 12 is a cross-sectional side view of a settling tank according to one embodiment of the present invention.
Figure 13:
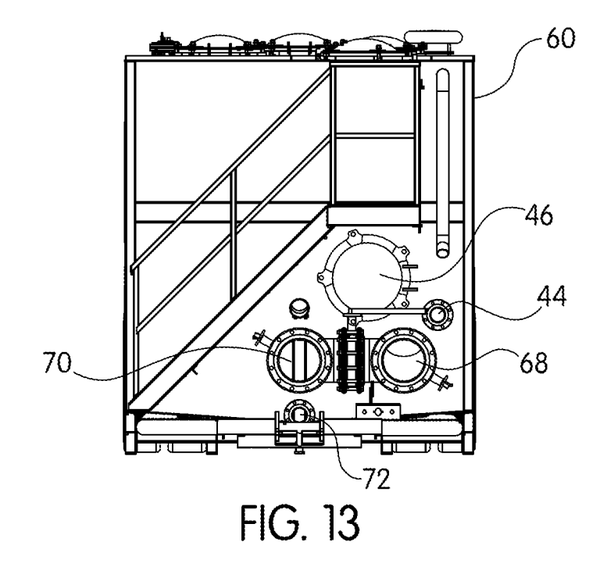
FIG. 13 is a front view of the first end of the settling tank shown in FIG. 12.
Figure 14:
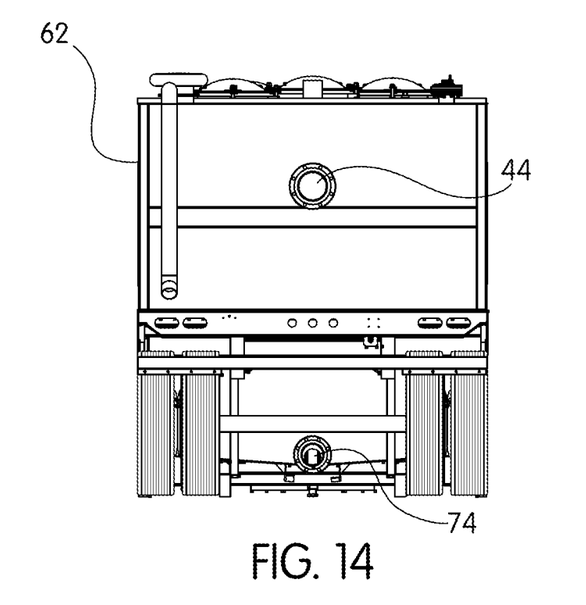
FIG. 14 is a front view of the second end of the settling tank shown in FIG. 12.
Figure 15:
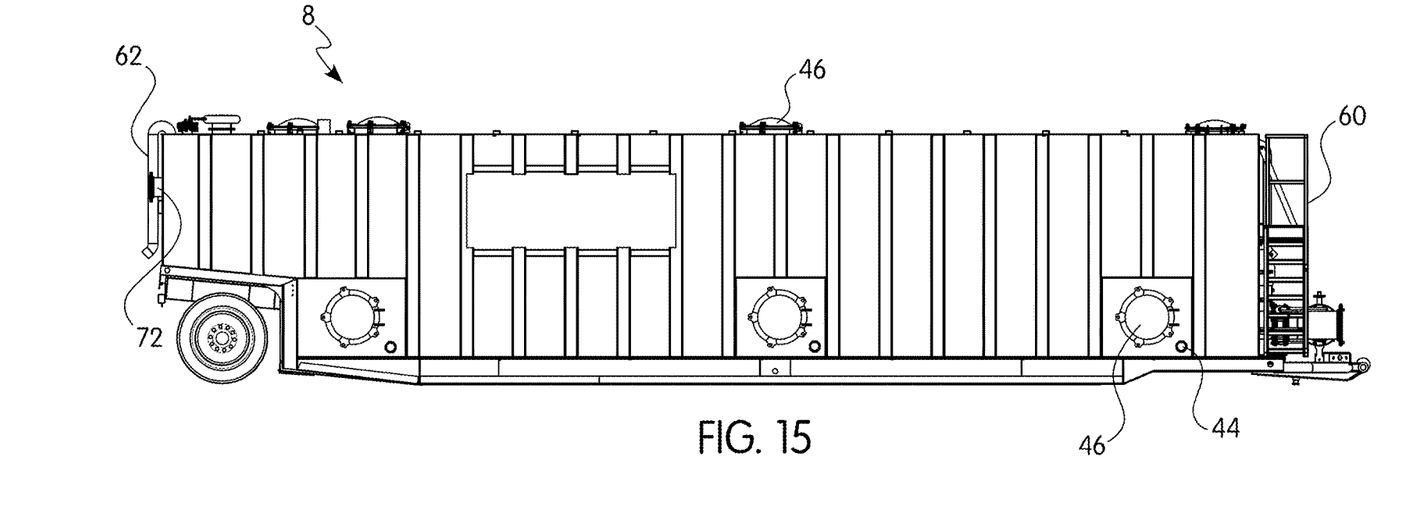
FIG. 15 is a side view of the settling tank of FIG. 12.
Figure 16:
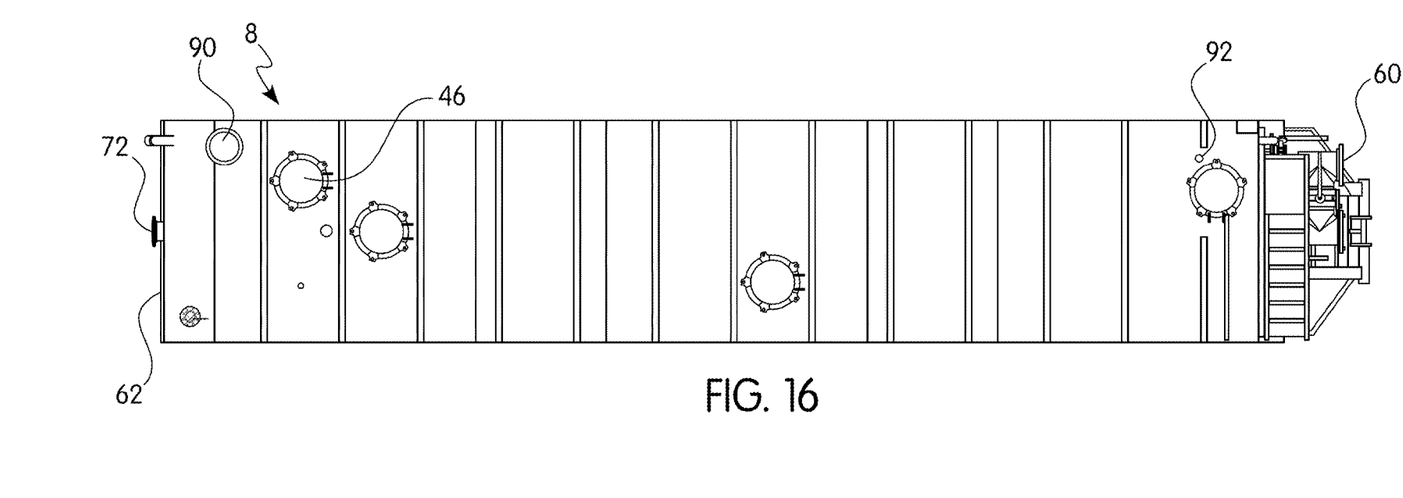
FIG. 16 is a top view of the settling tank of FIG. 12.

As indicated, flowback and produced water can be transported from a weir tank 6 or 48 and into a first settling tank 8 by way of a fluid connector 50. Referring to FIG. 12, the settling tank 8 can have a first end 60, a second end 62, and an internal chamber 64 with at least one baffle plate 66. As shown in FIG. 13, the first end 60 of the settling tank 8 can include a fluid inlet port 68 and a fluid outlet port 70. The first end 60 of the settling tank 8 can also include small access openings 44, manways 46, and a drain 72. As shown in FIG. 14, the second end 62 of the settling tank 8 can also include small access openings 44 and a drain 74. In certain preferred and non-limiting embodiments, small access openings 44 and/or manways 46 are also positioned on the sides of the settling tank 8 (see FIG. 15) and on the top of the settling tank 8 (see FIG. 16).

In certain preferred and non-limiting embodiments, referring to FIG. 12, an internal feed line 75 can be positioned within the internal chamber 64 of the settling tank 8. The internal feed line 75 can have a first end 76 and second end 77. The first end 76 can be connected to the fluid outlet port 70 of the settling tank 8, and the second end 77 can extend out toward the second end 62 of the settling tank 8. The second end 77 of the internal feed line 75 can have an opening 78 where water and other fluids can enter. The opening 78 can comprise a bell-shaped inlet that extends to a selected height within the internal chamber 64 of the settling tank 8. The elevated bell-shaped inlet prevents unwanted materials from entering the feed line 75.

As further shown in FIG. 12, the at least one baffle plate 66 can be positioned between the opening 78 at the second end 77 of the internal feed line 75 and the first end 60 of the settling tank 8. The baffle plate 66 can span the entire width of the internal chamber 64 and can have a top perimeter 80 and a bottom perimeter 82. The bottom perimeter 82 can be positioned below the opening 78 of the internal feed line 75 to prevent sludge and other materials from flowing into the opening 78. Further, a gap may be formed between the top perimeter 80 of the baffle plate 66 and a top portion 84 of the internal chamber 64 of the settling tank 8. The gap can allow sludge and other materials to flow past the baffle plate 66 if there is an excessive amount of these materials within the settling tank 8. The settling tank 8 can also have other components. For example, in certain preferred and non-limiting embodiments, the settling tank 8 can have heating tubes 88, pressure/vacuum relief valves 90, electronic gauge ports 92, and the like (see FIGS. 12 and 16).

During operation, flowback and produced water enters the settling tank 8 through the fluid inlet port 68 by way of the fluid connector 50. As flowback and produced water enters the first end 60 of the settling tank 8, water begins to flow to the second end 62 and fill the internal chamber 64. In certain embodiments, the flowback and produced water can flow through the settling tank 8 with a laminar flow. The laminar flow allows particles to naturally separate from the water. Once the water reaches a certain height within the internal chamber 64 of the settling tank 8, the water can enter the opening 78 of the internal feed line 75 and flow toward the fluid outlet port 70 at the first end 60 of the settling tank 8. In certain preferred and non-limiting embodiments, the internal feed line 75 is designed to provide, promote, facilitate, result in, and/or induce laminar flow. For example, the internal feed line 75 can have an internal diameter of greater than about 8 inches, or, in another example, greater than about 10 inches, to provide, promote, facilitate, result in, and/or induce laminar flow. In one preferred and non-limiting embodiment, the internal feed line 75 has a diameter of about 12 inches or greater.

Referring back to FIGS. 1 and 2, the treated flowback and produced water can flow to a second settling tank 94 after exiting the first settling tank 8. The water can naturally flow to the second settling tank 94 through a fluid connector 50 as described above. The second settling tank 94 can have the same design as the first settling tank 8 to naturally separate unwanted particles from the water. If desired, the mobile water re-use system can include additional settling tanks 96. Thus, in certain preferred and non-limiting embodiments, the mobile water re-use system can include two or more, three or more, or even five or more settling tanks 8. For instance, as shown in FIGS. 1 and 2, water can naturally flow to a third settling tank 96 after exiting the second settling tank 94.

In certain embodiments, the treated water can be transported back to the chemical treatment apparatus 4 after exiting the last settling tank (for example, the second settling tank 94, the third settling tank 96, or an additional settling tank). In another preferred and non-limiting embodiment, the treated water can be transported to a holding tank 10 for storage, and, if desired, the water can be transported back to the chemical treatment apparatus 4 at a later time. After being transported back to the chemical treatment apparatus 4, the water can be mixed in the fluid mixers 16 with chemicals 12 such as pesticides, antimicrobials, and the like to deter biological infestation and growth. For example, the water can be mixed with biocide to protect against biological and chemical contamination. The types of chemicals 12 that can be mixed with the treated water are not so limited and can include any chemical that is desired.

As indicated above, the present invention is also directed to a method of treating flowback and produced water. In certain preferred and non-limiting embodiments, the method includes transporting flowback and produced to a chemical treatment apparatus 4 comprising chemicals 12, pumping devices 14, and/or fluid mixers 16. Alternatively, in other preferred and non-limiting embodiments, the flowback and produced water is first transported to a separate filtering device or a weir tank 6 to remove large particles and sediment from the flowback and produced water before it enters the chemical treatment apparatus 4. After entering the chemical treatment apparatus 4, the flowback and produced water can be mixed with treatment chemicals 12 including, but not limited to, coagulation and flocculation compounds and compositions.

In certain preferred and non-limiting embodiments, the method further includes transferring the mixture of treatment chemicals 12 and flowback and produced water to a weir tank 6 comprising a first end 20, a second end 22, an internal chamber 24, and a plurality of baffles 26 positioned throughout the internal chamber 24. The baffles 26 can be arranged in any of the embodiments previously described to provide, promote, facilitate, result in, and/or induce turbulent flow through the internal chamber 24 while capturing sludge, oil, and/or other unwanted materials. After reaching the second end 22 of the weir tank 6, the water can exit the fluid outlet 38, which may include a hollow extension member 42 with a bell shaped inlet that extends to a selected height within the internal chamber 24 of the weir tank 6.

In one preferred and non-limiting embodiment, the method includes transferring the flowback and produced water back to the chemical treatment apparatus 4 after exiting the weir tank 6. The flowback and produced water can then be mixed with additional treatment chemicals 12 and transferred to a second weir tank 48. The second weir tank 48 can be configured in the same manner as the first weir tank 6 to provide, promote, facilitate, result in, and/or induce turbulent flow and capture unwanted materials contained within the water. When the treated water exits the second weir tank 48, the water can be transported to a first settling tank 8. In another preferred and non-limiting embodiment, the flowback and produced water is not transferred back to the chemical treatment apparatus 4 after exiting the first weir tank 6. Rather, in this embodiment, the method includes transferring the flowback and produced water directly to a settling tank 8 after exiting the first weir tank 6.

As previously described, the settling tank 8 can be designed to provide, promote, facilitate, result in, and/or induce laminar flow and allow particles to naturally separate from the water. For instance, in certain embodiments, the first settling tank 8 comprising a first end 60, a second end 62, and an internal chamber 64 with at least one baffle plate 66. As water enters the first end 60 of the settling tank 8, it will start filing the internal chamber 64 without causing turbulent flow. Once the water reaches a certain height, the water can flow past the at least one baffle plate 66, into the internal feed line 75 and out the outlet port 70 at the first end 60 of the settling tank 8 where it is transferred to a second settling tank 94 through laminar flow. This same separation process can be repeated in the second settling tank 94.

In certain preferred and non-limiting embodiments, the method further includes transferring the flowback and produced water to additional settling tanks 8 as may be deemed necessary to separate particles from the water. After exiting the last settling tank (for example, the second settling tank 94, the third settling tank 96, or an additional settling tank), the water can be transported back to the chemical treatment apparatus 4 or to a holding tank 10. As indicated, the water re-use system is mobile and can be transported from one location to another. Thus, after the flowback and produced water is treated according to the present invention, all or part of the system can be easily transported to a different location.

While various embodiments were provided in the foregoing description, those skilled in the art may make modifications and alterations to these embodiments without departing from the scope and spirit of the invention. For example, it is to be understood that this disclosure contemplates that, to the extent possible, one or more features of any embodiment can be combined with one or more features of any other embodiment. Accordingly, the foregoing description is intended to be illustrative rather than restrictive. The invention described hereinabove is defined by the appended claims and all changes to the invention that fall within the meaning and the range of equivalency of the claims are to be embraced within their scope.

What is claimed is:

1. A method of treating flowback and produced water, comprising:
    a) transferring flowback and produced water to a chemical treatment apparatus;
    b) mixing treatment chemicals with the flowback and produced water;
    c) transferring the mixture of treatment chemicals and flowback and produced water to a weir tank comprising a first end, a second end, an internal chamber, and a plurality of baffles positioned throughout the internal chamber to induce turbulent flow;
    d) transferring the mixture of treatment chemicals and flowback and produced water to a first settling tank that provides laminar flow;
    e) transferring the mixture of treatment chemicals and flowback and produced water to a second settling tank that provides laminar flow; and
    f) transferring the mixture of treatment chemicals and flowback and produced water to a third settling tank that provides laminar flow.

2. The method of claim 1, further comprising transferring the flowback and produced water to a filtering device or separate weir tank before step a).

3. The method of claim 1, further comprising transferring the treated water to a holding tank after step e).

4. The method of claim 1, further comprising transferring the separated water back to the chemical treatment apparatus after step e) and mixing the water with treatment chemicals.

5. The method of claim 1, wherein the flowback and produced water is simultaneously mixed with coagulation and flocculation chemicals in step b).

6. A method of treating flowback and produced water, comprising:
    mixing treatment chemicals with flowback and produced water to produce a fluid mixture;
    transferring the fluid mixture to a weir tank comprising a first end, a second end, an internal chamber, and a plurality of baffles positioned within the internal chamber, the plurality of baffles arranged to induce turbulent flow of the fluid mixture within the weir tank;
    transferring the fluid mixture from the weir tank to a first settling tank configured to induce laminar flow of the fluid mixture within the first settling tank; and
    transferring the fluid mixture from the first settling tank to at least one additional settling tank configured to induce laminar flow of the fluid mixture within the at least one additional settling tank.

7. The method of claim 6, wherein the fluid mixture is transferred to the at least one additional settling tank through a fluid connector.

8. The method of claim 6, wherein the treatment chemicals and the flowback and produced water are mixed within a chemical treatment apparatus.

9. The method of claim 8, wherein the at least one additional settling tank outputs separated water, the method further comprising:
    transferring the separated water to the chemical treatment apparatus; and
    mixing the separated water with at least one treatment chemical.

10. The method of claim 9, wherein the at least one treatment chemical comprises at least one of a pesticide and an antimicrobial.

11. The method of claim 6, wherein the treatment chemicals comprise coagulation and flocculation chemicals.

12. The method of claim 6, wherein the fluid mixture is transferred from the weir tank through a fluid outlet of the weir tank, the fluid outlet comprising a hollow extension member having a bell-shaped inlet extending to a height within the internal chamber of the weir tank.

13. The method of claim 6, wherein the fluid mixture is transferred to the first settling tank through a fluid connector having a diameter greater than 8 inches.

14. The method of claim 13, wherein the fluid connector is arranged in a horseshoe shape to induce laminar flow in the fluid mixture.

15. The method of claim 6, wherein the first settling tank comprises an internal chamber and at least one baffle plate arranged within the internal chamber.

16. The method of claim 15, further comprising separating the fluid mixture into separated water and particles within the first settling tank by flowing the fluid mixture into the internal chamber of the first settling tank such that the fluid mixture flows past the at least one baffle plate when the fluid mixture reaches a height within the internal chamber based on at least one of an internal feed line and an outlet port of the first settling tank.

17. The method of claim 6, further comprising separating at least a portion of unwanted material from the fluid mixture by flowing the fluid mixture through the plurality of baffles.

* * * * *